UNITED STATES PATENT OFFICE 2,069,166

ORGANO-MERCURY DERIVATIVES OF 1,2-ALIPHATIC - DIAMINE THIOSULPHATES AND PROCESS OF PRODUCING THEM

Morris S. Kharasch, Chicago, Ill., assignor to Eli Lilly and Company, Indianapolis, Ind., a corporation of Indiana No Drawing. Application June 23, 1934, Serial No. 732,088.

18 Claims. (Cl. 260—13)

The object of my invention is water-soluble organo - mercury 1,2 - aliphatic - diamine thiosulphates, and the process of producing them. I accomplish this by the interaction in water of insoluble or relatively insoluble organo-mercury compounds and 1,2-aliphatic-diamine thiosulphates.

A number of organo-mercuric compounds are known which have potential effectiveness as bactericidal, fungicidal, and aphidcidal agents, but which are greatly limited in their application by reason of their low water-solubility, sometimes amounting to substantial insolubility. These have the general formula R—Hg—Neg, in which R represents an alkyl or aryl radical, and Neg represents any negative ion, such for instance as the hydroxyl ion, a halogen, or an acid radical such as the acetic-acid radical or the thiocyanic-acid radical or the sulphuric-acid radical. Outstanding examples of these are phenyl-mercuric chloride (or bromide or iodide or hydroxide or acetate or thiocyanate or sulphate, etc.,) and ethyl-mercuric chloride (or bromide or iodide or hydroxide or acetate or thiocyanate or sulphate, etc.).

It is known that such organo-mercuric compounds can be temporarily converted into compounds of greater water solubility by causing them to react with sodium thiosulphate. In this way the effective organo-mercuric radical may be temporarily put into water solution. A typical example, using phenyl-mercuric chloride, of the reaction which produces the temporary solubility is as follows:

(1) 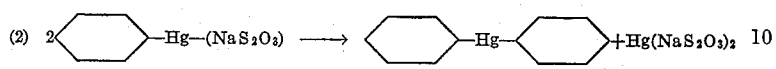

But the R-mercury-sodium-thiosulphate complex thus formed is not stable, and the solubility which is obtained is exceedingly evanescent; for said complex tends to break down by a "bridging" reaction to form an insoluble "bis" organomercuric compound R—Hg—R, as exemplified by the following equation showing the breaking down of phenyl-mercuric sodium thiosulphate into mercuric sodium thiosulphate and the insoluble mercury di-phenyl:

(2) 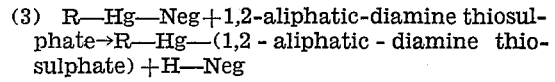

In time, of course, the mercuric sodium thiosulphate is broken down still further.

Because of this bridging reaction, and the resultant breaking-down, the solubility which is sometimes obtained by treating the insoluble organo-mercuric compound with sodium thiosulphate is of such short duration that it is practically valueless; for it is a progressive breakdown which proceeds from the moment the materials are mixed until the reaction, in the sense indicated in Equation 2, is complete.

I have found that by treating the initial and relatively insoluble organo-mercuric compounds with a 1,2-aliphatic-diamine thiosulphate, I am able to produce a relatively permanent water solution containing the desired organo-mercuric radical. The following general equation shows the nature of this reaction:

(3) R—Hg—Neg+1,2-aliphatic-diamine thiosulphate→R—Hg—(1,2 - aliphatic - diamine thiosulphate) +H—Neg where R represents an alkyl or aryl radical, and Neg represents any negative ion, which will not form with the products of reaction an insoluble mercury compound. An example of this, with phenyl-mercuric chloride as the initial mercurial, and with 1,2-ethylenediamine thiosulphate as the 1,2-aliphatic-diamine thiosulphate, is as follows:

(4) 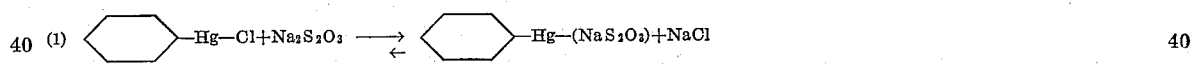
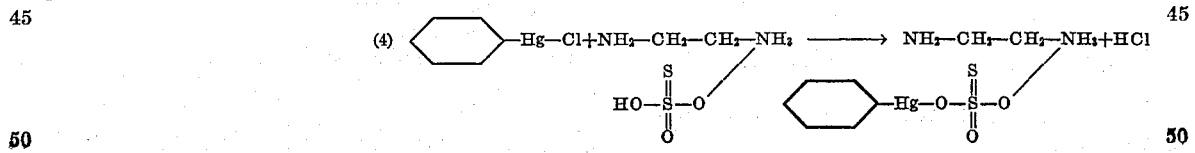

Another example is the reaction of ethyl-mercuric chloride with 1,2-propylenediamine thiosulphate, represented as follows:

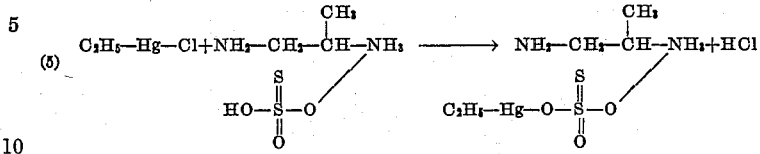

The phenyl group and the ethyl group are merely typical examples of aryl and alkyl radicals which R may represent. Instead of the ethyl group, any alkyl radical of the paraffin series may be used, at least up to those having six carbon atoms, such for instance as methyl, propyl, butyl, isobutyl, amyl and its various isomers, and hexyl and its various isomers. Similarly, instead of the phenyl group, various other aryl radicals may be used, such for instance as tolyl, or p-chlorophenyl, p-bromophenyl, or xylyl. Also if R represents an aryl radical, it is not necessarily with the mercury joined to a benzene ring; for the ring may be of other types than the benzene ring, such for instance as cyclohexyl and cyclopentyl, and even if it is a benzene ring there may be one or more intervening methylene groups such for instance as in the benzyl and phenyl-ethyl radicals.

All of the variations of which these are examples are included in my invention.

Similarly, in place of having chlorine as the negative ion in the reaction, other negative ions may be in the initial organo-mercuric compounds, such for instance as another halogen, or the hydroxyl group, or an acid radical such as the acetic-acid radical or the sulphuric-acid radical or the thiocyanic-acid radical.

With any of these variations, tiosulphates of any of the 1,2-aliphatic-diamines may be used. Chief among these are 1,2-ethylenediamine thiosulphate and 1,2-propylenediamine thiosulphate; but these are named as examples and not as limitations.

In this way I can form stable and permanent solutions of a number of compounds of this general class. These include the following:

a. Phenyl-mercuric ethylenediamine thiosulphate,
b. Tolyl-mercuric ethylenediamine thiosulphate,
c. Cyclohexyl-mercuric ethylenediamine thiosulphate,
d. Cyclopentyl-mercuric ethylenediamine thiosulphate,
e. Benzyl-mercuric ethylenediamine thiosulphate,
f. Methyl-mercuric ethylenediamine thiosulphate,
g. Eethyl-mercuric ethylenediamine thiosulphate,
h. Propyl-mercuric ethylenediamine thiosulphate,
i. Butyl-mercuric ethylenediamine thiosulphate,
j. Amyl-mercuric ethylenediamine thiosulphate,
k. Hexyl-mercuric ethylenediamine thiosulphate,
l. Phenyl-mercuric propylenediamine thiosulphate,
m. Tolyl-mercuric propylenediamine thiosulphate,
n. Cyclohexyl-mercuric propylenediamine thiosulphate,
o. Cyclopentyl-mercuric propylenediamine thiosulphate,
p. Benzyl-mercuric propylenediamine thiosulphate,
q. Methyl-mercuric propylenediamine thiosulphate,
r. Ethyl-mercuric propylenediamine thiosulphate,
s. Propyl-mercuric propylenediamine thiosulphate,
t. Butyl-mercuric propylenediamine thiosulphate,
u. Amyl-mercuric propylenediamine thiosulphate, and
v. Hexyl-mercuric propylenediamine thiosulphate.

Any of these compounds are effective as bactericides, fungicides, (for seed fungi, such for instance as diplodia and fusaria, as well as for the fungi which cause the blue stain of lumber, etc.), and aphidcides; and are effective in the treatment of small grains, and in the treatment and prevention of blue stain in lumber. Generally speaking, they are substantially as active bactericidally as are the organo-mercuric compounds from which they were derived; and they have not only the advantage of relatively high solubility, but the additional advantage that they are substantially free from the erythemia-producing properties so common to mercurials.

In general, in order to get the desired reaction and the desired solubility, it is usually sufficient in carrying out the reaction indicated by Equation 3 to use approximately one molecular equivalent of the 1,2-aliphatic-diamine thiosulphate, to one molecular equivalent of the initial organo-mercuric compound; but it is permissible to use a larger or smaller quantity of the 1,2-aliphatic-diamine thiosulphate if desired.

When the organo-mercuric-1,2-aliphatic-diamine thiosulphate is obtained in water solution by the reaction shown in Equation 3 above, it is desirable that the solution be kept at least as alkaline as pH 6.5; it is better that it be kept at least as alkaline as pH 7.2; and preferably at about pH 8.0. To obtain this pH value, it is desirable to add the necessary amount of a 1,2-aliphatic-diamine (not the thiosulphate thereof), such for instance as ethylenediamine. If the solution is allowed to become too acid, its stability is decreased.

However, the decrease in the stability on the acid side of these organo-mercuric 1,2-aliphatic-diamine thiosulphates, is relatively slight, and when in solution they are much more stable toward acids than is usually the case with soluble mercurials. In most instances, even the addition of concentrated hydrochloric acid does not produce an immediate precipitate.

The solutions of these compounds can be made of various strengths, in every instance up to at least an effective bactericidal strength, such for instance as a concentration of 1:1000. In many instances, as in ethyl-mercuric ethylenediamine thiosulphate, obtained by the reaction of ethyl-mercuric chloride with 1,2-ethylenediamine thiosulphate, I can obtain solutions many times more concentrated than that, frequently up to a concentration exceeding 0.5% and in some instances even reaching 1% to 2%. The concentrations obtainable are far in excess of those obtainable with the corresponding initial organo-mercuric compounds—such for instance as ethyl-mercuric chloride in the example given.

In preparing these organo-mercuric-aliphatic-diamine thiosulphates, I find it desirable to use a procedure which is exemplified by the following example; in which phenyl-mercuric chloride is treated with 1,2-ethylenediamine thiosulphate:

One gram of phenyl-mercuric chloride is desirably first moistened with a small quantity of alcohol or acetone. Then a quantity of water, usually about 100 cc., is added. An immediate precipitate occurs. This precipitate, without removing the alcohol or acetone, is treated with a water solution of a molecular equivalent of 1,2-ethylenediamine thiosulphate, conveniently in 50 or 100 cc. of water. Most of the precipitate dissolves readily, and the whole is then diluted to one liter, and filtered. The solution thus obtained is quite stable, particularly when brought to a pH of 8.0 by the addition of 1,2-ethylenediamine or some other base. It does not precipitate any mercury di-phenyl, such as is characteristic when an interaction is obtained between phenyl-mercuric chloride and sodium thiosulphate.

Although the phenyl-mercuric-ethylenediamine thiosulphate complex exists in solution in the presence of chloride ions, which have a tendency to reverse the reaction to reform the initial insoluble phenyl-mercuric chloride, it is sufficiently stable so that it is unnecessary to employ the ethylenediamine thiosulphate in excess; although that may be done for added safety if desired, or even some aliphatic-diamine sulphite may be added. In the last-named case sufficient ethylenediamine or propylenediamine, (not the thiosulphate thereof,) is added to produce a pH of 7.0 to 8.0; although this is not absolutely essential, because of the quite high stability of my products even in the presence of acids.

The 1,2-aliphatic-diamine thiosulphates which I use in reactions 3, 4, and 5 are themselves new compounds, so far as I am aware, and have not been described previously. They are invented by me, but are not claimed in the present application; as they form the subject-matter of my co-pending application Serial No. 75,751, filed April 22, 1936.

They may be prepared from the corresponding 1,2-aliphatic-diamine sulphites, as from 1,2-ethylenediamine sulphite or 1,2-propylenediamine sulphite by additionally sulphurizing the sulphite.

This is conveniently done by heating the chosen 1,2-aliphatic-diamine sulphite with sulphur, in boiling water, for one to two hours; then concentrating to a small volume (or to dryness) by evaporation of the water (desirably under vacuum); and then adding acetone, which precipitates the 1,2-aliphatic-diamine thiosulphate. This is collected on a filter, and may be crystallized from a small amount of water or alcohol-water mixture. On cooling it separates from that solvent-mixture, in the form of beautiful white crystals.

1,2-ethylenediamine acid thiosulphate melts at 218° C., with decomposition. An analysis of it for nitrogen and for sulphur indicates that its formula is:

(6) $(S_2O_3H)-NH_3-CH_2-CH_2-NH_2$

If 1,2-ethylenediamine thiosulphate is formed in a solution containing an excess of ethylenediamine, or if 1,2-ethylenediamine acid thiosulphate is dissolved in water containing an excess of ethylenediamine, normal ethylenediamine thiosulphate is formed in the solution; as for instance if the hydrogen ion concentration is adjusted to pH 8.0 by the addition of ethylenediamine, as was stated earlier in this specification as desirable. I have not separated the normal ethylenediamine thiosulphate in solid form. Probably there is complete or substantially complete ionization of the ethylenediamine thiosulphate, whether acid or normal, in solution. Either the acid salt or the normal salt is effective in carrying out in substance, with the obvious variations necessitated by the use of the normal salt as one of the initial reactants, the reactions of Equations 3, 4 and 5 to produce the desired organo-mercury 1,2-aliphatic-diamine thiosulphate; although, as already stated, I prefer to have the solution alkaline by reason of the presence of an excess of ethylenediamine, which in effect involves the presence of the normal ethylenediamine thiosulphate.

1,2-propylenediamine acid thiosulphate melts at 186° C., with decomposition. An analysis of it for nitrogen and for sulphur indicates that its formula is:

(7) $(S_2O_3H)-NH_3-CH_2-CH-NH_2$
$\phantom{(S_2O_3H)-NH_3-CH_2-C}|$
$\phantom{(S_2O_3H)-NH_3-CH_2-CH}CH_3$ The 1,2-aliphatic-diamine sulphites which are used for preparing the corresponding thiosulphates are also new with me, but have been described in my co-pending application Serial No. 725,483, filed May 14, 1934.

These aliphatic-diamine sulphites may be prepared in various ways. Perhaps the most convenient way is by causing the corresponding 1,2-aliphatic-diamine to react with sulphur dioxide or sulphurous acid; conveniently by passing sulphur dioxide into either an absolute or aqueous alcohol solution of the desired 1,2-aliphatic-diamine (such as 1,2-ethylenediamine or 1,2-propylenediamine) or into an acetone solution of such diamine; upon which the corresponding 1,2-aliphatic-diamine sulphite separates in solid form.

I claim as my invention:

1. A compound of the radical R—Hg— with a lower 1,2-aliphatic-diamine thiosulphate having the following formula: R—Hg—(1,2-aliphatic-diamine thiosulphate) where R represents a radical of the class consisting of alkyl radicals having between 1 and 6 carbon atoms and radicals of the benzene and the cycloparaffin series.

2. A water-soluble compound produced by the reaction of a solution of a lower 1,2-aliphatic-diamine thiosulphate with an organo-mercuric compound of the general formula R—Hg—Neg, where R represents a radical of the class consisting of alkyl radicals having between 1 and 6 carbon atoms and radicals of the benzene and the cycloparaffin series, and Neg represents a negative ion which will not form with the products of reaction an insoluble mercury compound.

3. A phenyl-mercuric-1,2-aliphatic-diamine thiosulphate, where the 1,2-aliphatic-diamine radical is of a lower 1,2-aliphatic-diamine.

4. An ethyl-mercuric-1,2-aliphatic-diamine thiosulphate, where the 1,2-aliphatic-diamine radical is of a lower 1,2-aliphatic-diamine.

5. Phenyl-mercuric-1,2-ethylenediamine thiosulphate.

6. Ethyl-mercuric-1,2-ethylenediamine thiosulphate.

7. The process of producing a water-soluble mercurial, which consists in reacting a solution of an excess of a lower 1,2-aliphatic-diamine thiosulphate with a compound of the general formula R—Hg—Neg, in which R represents a radical of the class consisting of alkyl radicals having between 1 and 6 carbon atoms and radicals of the benzene and the cycloparaffin series, and Neg represents a negative ion which will not form with the products of reaction an insoluble mercury compound.

8. The process of producing a water-soluble mercurial, which consists in reacting a solution of a lower 1,2-aliphatic-diamine thiosulphate with a compound of the general formula R—Hg—Neg, in which R represents a radical of the class consisting of alkyl radicals having between 1 and 6 carbon atoms and radicals of the benzene and the cycloparaffin series, and Neg represents a negative ion which will not form with the products of reaction an insoluble mercury compound.

9. The process of producing a water-soluble mercurial, which consists in reacting a solution of an excess of a lower 1,2-aliphatic-diamine thiosulphate with a compound of the general formula R—Hg—Cl, in which R represents a radical of the class consisting of alkyl radicals having between 1 and 6 carbon atoms and radicals of the benzene and the cycloparaffin series.

10. The process of producing a water-soluble mercurial, which consists in reacting a solution of a lower 1,2-aliphatic-diamine thiosulphate with a compound of the general formula R—Hg—Cl, in which R represents a radical of the class consisting of alkyl radicals having between 1 and 6 carbon atoms and radicals of the benzene and the cycloparaffin series.

11. The process of producing a water-soluble mercurial, which consists in reacting a solution of an excess of 1,2-ethylenediamine thiosulphate with a compound of the general formula R—Hg—Neg, in which R represents a radical of the class consisting of alkyl radicals having between 1 and 6 carbon atoms and radicals of the benzene and the cycloparaffin series, and Neg represents a negative ion which will not form with the products of reaction an insoluble mercury compound.

12. The process of producing a water-soluble mercurial, which consists in reacting a solution of 1,2-ethylenediamine thiosulphate with a compound of the general formula R—Hg—Neg, in which R represents a radical of the class consisting of alkyl radicals having between 1 and 6 carbon atoms and radicals of the benzene and the cycloparaffin series, and Neg represents a negative ion which will not form with the products of reaction an insoluble mercury compound.

13. The process of producing a water-soluble mercurial, which consists in reacting a solution of an excess of 1,2-ethylenediamine thiosulphate with a compound of the general formula R—Hg—Cl, in which R represents a radical of the class consisting of alkyl radicals having between 1 and 6 carbon atoms and radicals of the benzene and the cycloparaffin series.

14. The process of producing a water-soluble mercurial, which consists in reacting a solution of 1,2-ethylenediamine thiosulphate with a compound of the general formula R—Hg—Cl, in which R represents a radical of the class consisting of alkyl radicals having between 1 and 6 carbon atoms and radicals of the benzene and the cycloparaffin series.

15. The process of producing a water-soluble mercurial, which consists in reacting a solution of an excess of 1,2-ethylenediamine thiosulphate with phenyl-mercuric chloride.

16. The process of producing a water-soluble mercurial, which consists in reacting a solution of 1,2-ethylenediamine thiosulphate with phenyl-mercuric chloride.

17. The process of producing a water-soluble mercurial, which consists in reacting a solution of an excess of 1,2-ethylenediamine thiosulphate with ethyl-mercuric chloride.

18. The process of producing a water-soluble mercurial, which consists in reacting a solution of 1,2-ethylenediamine thiosulphate with ethyl-mercuric chloride.

MORRIS S. KHARASCH.